(12) United States Patent
Wakabayashi

(10) Patent No.: US 7,442,454 B2
(45) Date of Patent: Oct. 28, 2008

(54) FUEL CELL SYSTEM

(75) Inventor: Keisuke Wakabayashi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 458 days.

(21) Appl. No.: 10/780,767

(22) Filed: Feb. 19, 2004

(65) Prior Publication Data

US 2004/0170877 A1    Sep. 2, 2004

(30) Foreign Application Priority Data

Feb. 28, 2003    (JP) ............................. 2003-054275

(51) Int. Cl.
*H01M 8/04* (2006.01)
(52) U.S. Cl. .......................... 429/22; 429/13
(58) Field of Classification Search .................. None
See application file for complete search history.

(56) References Cited

U.S. PATENT DOCUMENTS

| | | | |
|---|---|---|---|
| 5,058,032 A | 10/1991 | Farrell et al. | |
| 6,216,092 B1 | 4/2001 | Kong | |
| 6,709,779 B2 * | 3/2004 | Uozumi | 429/24 |
| 7,052,790 B2 * | 5/2006 | Nakamura et al. | 429/26 |
| 2002/0164511 A1 | 11/2002 | Uozumi | |
| 2004/0028963 A1 | 2/2004 | Kormann et al. | |

FOREIGN PATENT DOCUMENTS

| | | | |
|---|---|---|---|
| JP | 5-315002 A | | 11/1993 |
| JP | 09-231990 | * | 9/1997 |
| JP | 9-231990 A | | 9/1997 |
| JP | 2000-208157 A | | 7/2000 |
| JP | 2001-035519 A | | 2/2001 |
| JP | 2002-141095 A | | 5/2002 |
| JP | 2002-216817 A | | 8/2002 |
| JP | 2002-313377 A | | 10/2002 |
| JP | 2003-031251 A | | 1/2003 |
| JP | 2003-036869 A | | 2/2003 |
| WO | WO 02/063707 A2 | | 8/2002 |

OTHER PUBLICATIONS

Final Decision of Rejection for Japanese Application 2003-054275, Jan. 22, 2008, Japanese Patent Office.

* cited by examiner

*Primary Examiner*—John S Maples
(74) *Attorney, Agent, or Firm*—Foley & Lardner LLP

(57) ABSTRACT

A fuel cell is protected from performance degradation and damage by determining when an ion exchange resin filter needs replacement before the occurrence of an increase in the electric conductivity of water used in the fuel cell system. The replacement time of the ion exchange resin filter 11 is judged by an ion-exchange capacity judging part 152 on the basis of the result of comparing a reference electric conductivity as preset with the electric conductivity of coolant water circulating in a coolant water cycle as measured by an electric conductivity meter 12 a predetermined time after a coolant water pump 14 starts operation.

10 Claims, 5 Drawing Sheets

FUEL CELL SYSTEM

BACKGROUND OF THE INVENTION

1. Field of the Invention

The present invention is related to a fuel cell system equipped with a water treatment system, such as an ion exchange resin filter for a coolant water cycle or a pure water cycle.

2. Description of the Related Art

When the electric conductivity of water in a fuel cell increases for example due to ion elution from components used in a coolant water cycle or a pure water cycle of the fuel cell system, there is the possibility of a short circuit or isolation disruption in the fuel cell. For this reason, some fuel cell systems are provided with a water treatment system such as an ion exchange resin filter in a coolant water cycle or a pure water cycle in order to maintain a low electric conductivity of coolant water and pure water in the fuel cell system.

In a related art of a fuel cell system, cooling pure water is circulated through a main pipe arrangement in a solid polymer fuel cell, passing through a heat exchanger for the purpose of cooling the solid polymer fuel cell. On the other hand, concurrently, cooling pure water stored in a main tank is circulated through a subordinate pipe arrangement in which is provided an ion removing filter for removing conductive ions from the cooling pure water, while always maintaining the concentration of conductive ions lower than a predetermined level.

SUMMARY OF THE INVENTION

In the case of a fuel cell system provided with a mechanism for removing ions such as an ion exchange resin filter in a coolant water cycle or a pure water cycle, the ion exchange resin filter and the like has to be replaced in a case where the operating life of the ion exchange resin filter expires so that the electric conductivity of coolant water or pure water rises or an effective insulation resistance can no longer be measured. In the conventional fuel cell system, it is usually judged that an ion exchange resin filter needs replacement by detecting an elevation in the electric conductivity of coolant water or pure water in the fuel cell system.

However, according to such a technique, it is judged that an ion exchange resin filter needs replacement only after a malfunction occurs in the fuel cell or after an effective insulation resistance can no longer be assured. For this reason, by the time an ion exchange resin filter is replaced, the fuel cell has possibly been damaged by problems such as a short circuit or isolation disruption in the fuel cell due to the elevation of the electric conductivity of coolant water or pure water.

In accordance with the present invention, it is possible to judge when an ion exchange resin filter needs replacement in advance of the elevation of the electric conductivity of water used in the fuel cell system and prevent the fuel cell thereof from being degraded or damaged.

According to a technical aspect of the present invention, a fuel cell system includes a fuel cell, a circulating water pump, an ion exchange resin filter and an electric conductivity meter along a circulating flow path, and is provided with a judgment part which judges whether replacement of the ion exchange resin filter is needed on the basis of the result of comparison between a predetermined reference and the electric conductivity of water circulating in the circulating flow path as measured by the electric conductivity meter a predetermined time after a start of water circulation.

DESCRIPTION OF THE PREFERRED EMBODIMENT

Figure 1:
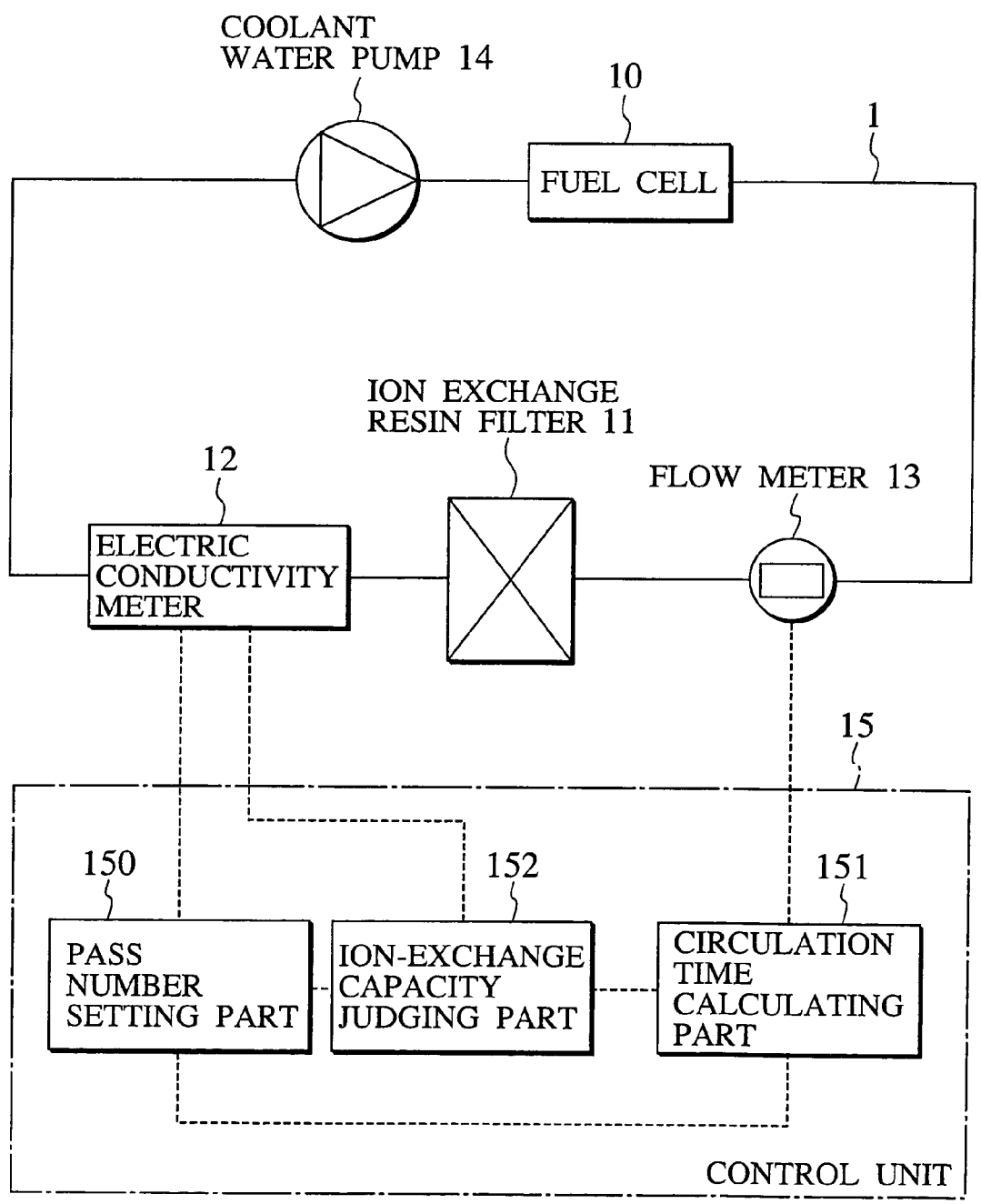
FIG. 1 is a view showing the configuration of the circulating system for circulating coolant water in a fuel cell system according to a first embodiment of the present invention.

In the following description, several embodiments of the present invention will be explained in conjunction with the accompanying drawings. FIG. 1 is a view showing the configuration of the circulating system for circulating coolant water in a fuel cell system according to a first embodiment of the present invention. The coolant water system for circulating coolant water in the fuel cell system according to the first embodiment as shown in FIG. 1 are provided with a fuel cell 10, an ion exchange resin filter 11 provided for collecting eluted ions and decreasing the electric conductivity of coolant water, an electric conductivity meter 12 for measuring the electric conductivity of the coolant water circulated in the system, a flow meter 13 for measuring the flow rate of the coolant water, a closed flow path 1 including a coolant water pump 14 for circulating the coolant water, and a control unit 15 for judging when the ion exchange resin filter 11 needs replacement. The ion exchange resin filter 11 is a filter made of a polymerized resin containing positively or negatively charged sites that can attract ions of the opposite charge by displacement.

In accordance with the present invention, a pass number (circulation number) is calculated as the number of times a virtual group of water defining a volume circulates in the closed flow path 1 by the use of a unit time period estimated within which the virtual group of water passes through the flow path across a particular position of the flow path. The control unit 15 includes a pass number setting part 150 for setting a pass number of the coolant water circulation before measuring an electric conductivity as a criterion for judging the ion-exchange capacity of the ion exchange resin filter 11, and a circulation time calculating part 151 for calculating a circulation time period to elapse before measurement of the electric conductivity on the basis of the total volume of the coolant water in the system, the flow rate of the coolant water as measured by the flow meter 13 and the pass number as set by the pass number setting part 150. Furthermore, the control unit 15 is provided with an ion-exchange capacity judging part 152 for judging whether or not the ion exchange resin filter 11 needs replacement based on an estimated electric conductivity value calculated as being measured after the start of water circulation with a predetermined period related to the predetermined pass number on the assumption that the ion-exchange efficiency of the ion exchange resin filter 11 is normal and the electric conductivity actually measured by the electric conductivity meter 12 after the predetermined period. When a predetermined pass number has been reached the predetermined period of time has elapsed.

Figure 2:
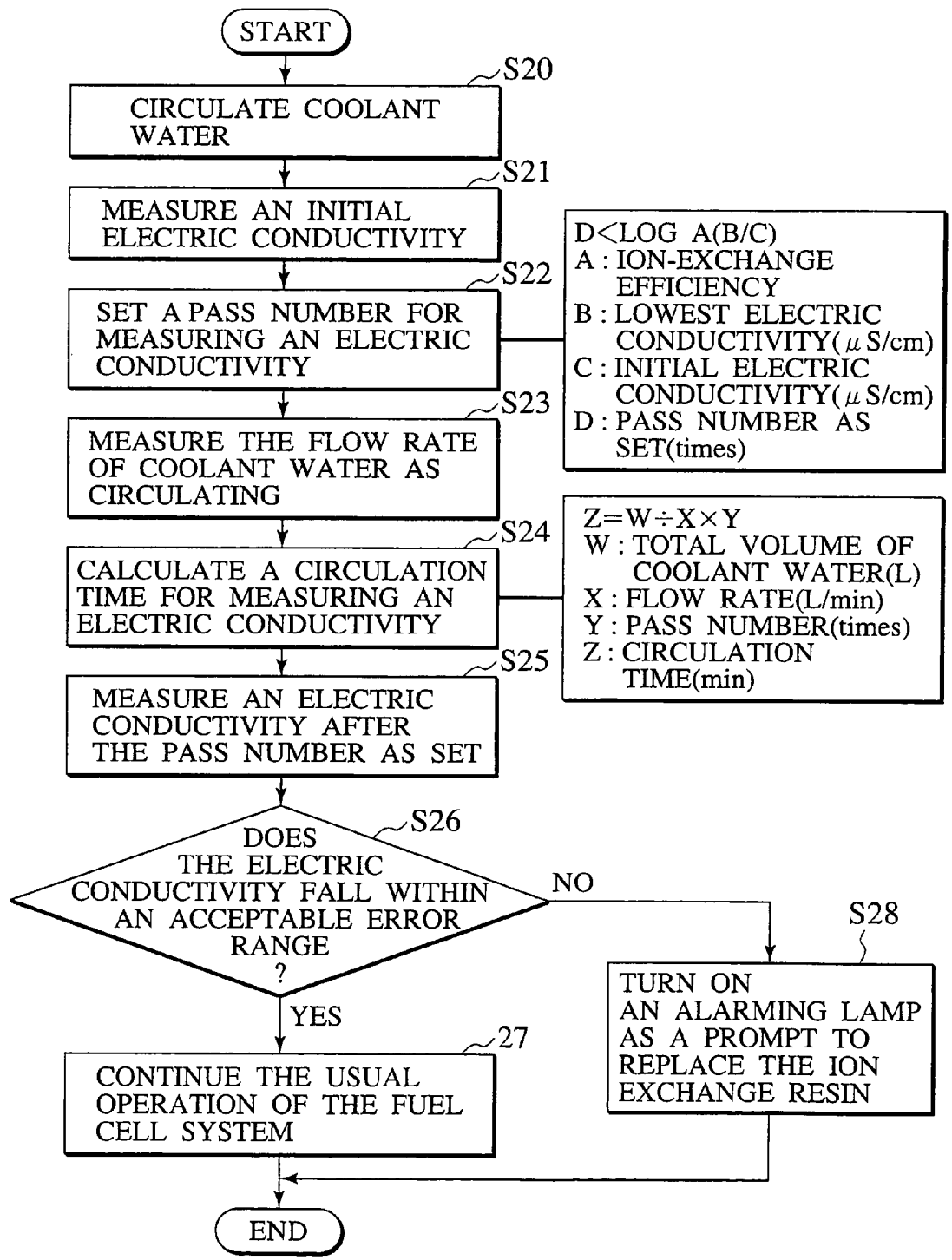
FIG. 2 is a flowchart showing the operation of the first embodiment of the present invention.
Figure 3:
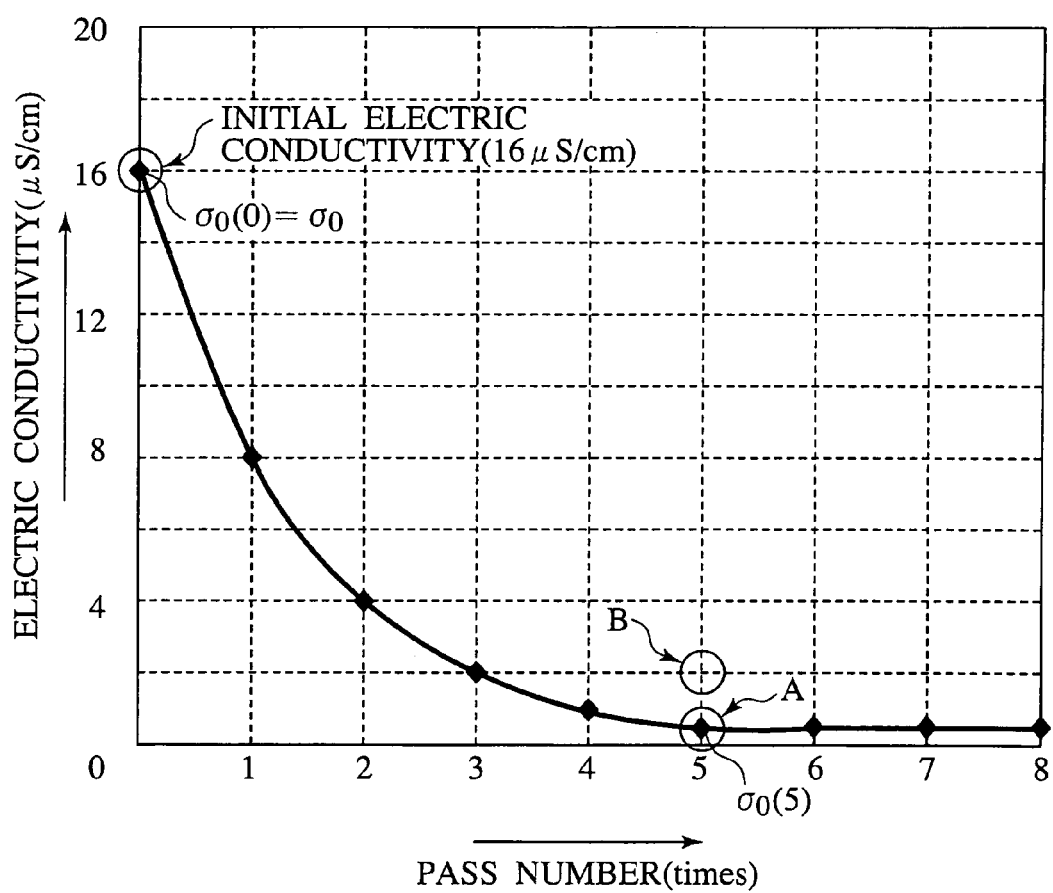
FIG. 3 is a view showing the relationship between the pass number and the electric conductivity.

The operation of the present embodiment will be explained with reference to the flowchart as shown in FIG. 2. When the fuel cell system starts operation, the coolant water pump 14 is operated to circulate coolant water through the system in the step S20. In the step S21, the initial electric conductivity of the coolant water is measured by the electric conductivity meter 12 just after starting circulation. After the measurement, in the step S22, the pass number setting part 150 of the control unit 15 calculates a pass number n before measuring the electric conductivity, as a criterion of judging the ion-exchange capacity of the ion exchange resin filter 11, on the basis of the electric conductivity as measured in the step S21. FIG. 3 is an exemplary graphic diagram showing the relationship between the pass number (circulation number) and the electric conductivity by way of an example of an electric conductivity curve with an ion-exchange efficiency of 50% and an initial electric conductivity of 16 μS/cm. The electric conductivity curve indicates an exponential decay with the circulation time elapsing from the initial electric conductivity σ(0) corresponding to the pass number n=0, and asymptotically approaches a steady-state value after a predetermined time. Accordingly, since it is difficult to accurately estimate the electric conductivity curve by measuring the electric conductivity after converging to the steady-state value, a pass number just before the convergence to the steady-state value is calculated in accordance with the following expression (1):

$$D < \log A(B/C) \quad (1),$$

where A is the ion-exchange efficiency which is determined by the type of the ion exchange resin filter inserted into the ion exchange resin filter 11; B is the lower limit (μS/cm) of the electric conductivity of the coolant water as decreased after passing through the ion exchange resin filter 11; C is the initial electric conductivity of the coolant water just after the start of circulation; and D is the circulation number (pass number) corresponding to the circulation time period to elapse before the electric conductivity is measured for judging the ion-exchange capacity of the ion exchange resin filter 11.

In the step S23, the flow rate of the coolant water as circulating is measured by the flow meter 13. In the step S24, the circulation time calculating part 151 estimates the time to measure the electric conductivity as a criterion of judging the ion-exchange capacity of the ion exchange resin filter in accordance with the following expression (2) on the basis of the total volume (given information) of the coolant water in the cooling system, the flow rate of the coolant water as circulating as measured by the flow meter 13 and the pass number for the measurement of the electric conductivity as calculated by the pass number setting part 150 such as $$Z = W \cdot (Y/X) \quad (2),$$

where W is the total volume (in units of liters) of the coolant water as given information; X is the flow rate (in units of liters per minute) of the coolant water as circulating as measured by the flow meter 13; Y is the number of times the coolant water passes across the ion exchange resin filter 11; and Z is the circulation time (in units of minutes) before reaching the pass number as set by the pass number setting part 150. Incidentally, in a case where the flow rate X of the coolant water as circulating changes or fluctuates during calculation, one path cycle can be counted when W is reached by $w(t) = \int X(t)dt/Y$.

In the step S25, the electric conductivity is measured after the time Z has passed as calculated in the step S24. In the step 26, it is judged whether or not the electric conductivity actually measured falls within an acceptable range of error by comparing an estimated electric conductivity value calculated as being measured when the predetermined pass number is reached on the assumption that the ion exchange resin has a normal ion-exchange capacity with the electric conductivity actually measured after the predetermined pass number. If it is confirmed in the step S26 that the electric conductivity actually measured falls within an acceptable error range (for example within 5% as shown by circle A in FIG. 3) of the electric conductivity $\sigma_0(n)$ as expected when the ion-exchange capacity is normal (i.e., when the ion-exchange capacity has not yet reached the operating life of the ion exchange resin filter 11 but maintains the initial ion-exchange capacity), then it is judged that the ion exchange resin filter 11 is still able to continue the operation of the fuel cell system in the step S27. On the contrary, if it is confirmed that the electric conductivity $\sigma(n)$ actually measured falls outside the acceptable error range of the anticipated electric conductivity $\sigma_0(n)$ as expected, then it is judged that the ion exchange resin filter needs replacement, and an alarm lamp is turned on as a prompt to replace the ion exchange resin filter 11. Meanwhile, range B as shown in FIG. 3 indicates an exemplary range of the anticipated electric conductivity $\sigma_D(5)$ for an end-of-life ion exchange resin filter after a pass number of 5.

As explained above, in accordance with the above first embodiment, it is possible to surely judge whether the ion exchange resin filter 11 needs replacement before the operating life of the ion exchange resin filter 11 expires and therefore to avoid problems such as a short circuit or isolation disruption in the fuel cell due to the elevation of the electric conductivity of coolant water after the operating life of the ion exchange resin filter 11 expires.

As described above, if the electric conductivity is measured after the electric conductivity converges to a steady-state value, it is difficult to accurately estimate the ion-exchange capacity of the ion exchange resin filter 11. In order to avoid such a situation, the pass number for measuring the electric conductivity is reset as a criterion of judging the ion-exchange capacity on the basis of the initial electric conductivity to accurately evaluate the ion-exchange capacity by measuring the electric conductivity always before the electric conductivity converges to a steady-state value.

Furthermore, while a function $\sigma_0(n)$ is prepared in association with time (a pass number of n) to obtain the electric conductivity to be measured if the ion exchange resin filter 11 has a normal ion-exchange efficiency, a reference electric conductivity is defined as an electric conductivity after the predetermined pass number and therefore the judgment is ensured to always be accurate by adjusting the reference electric conductivity in accordance with the variable judgment time. The judgment of whether replacement is needed is performed after the predetermined pass number so that it is possible to accurately judge even if the flow rate of water as circulating has changed.

Second Embodiment

Figure 4:
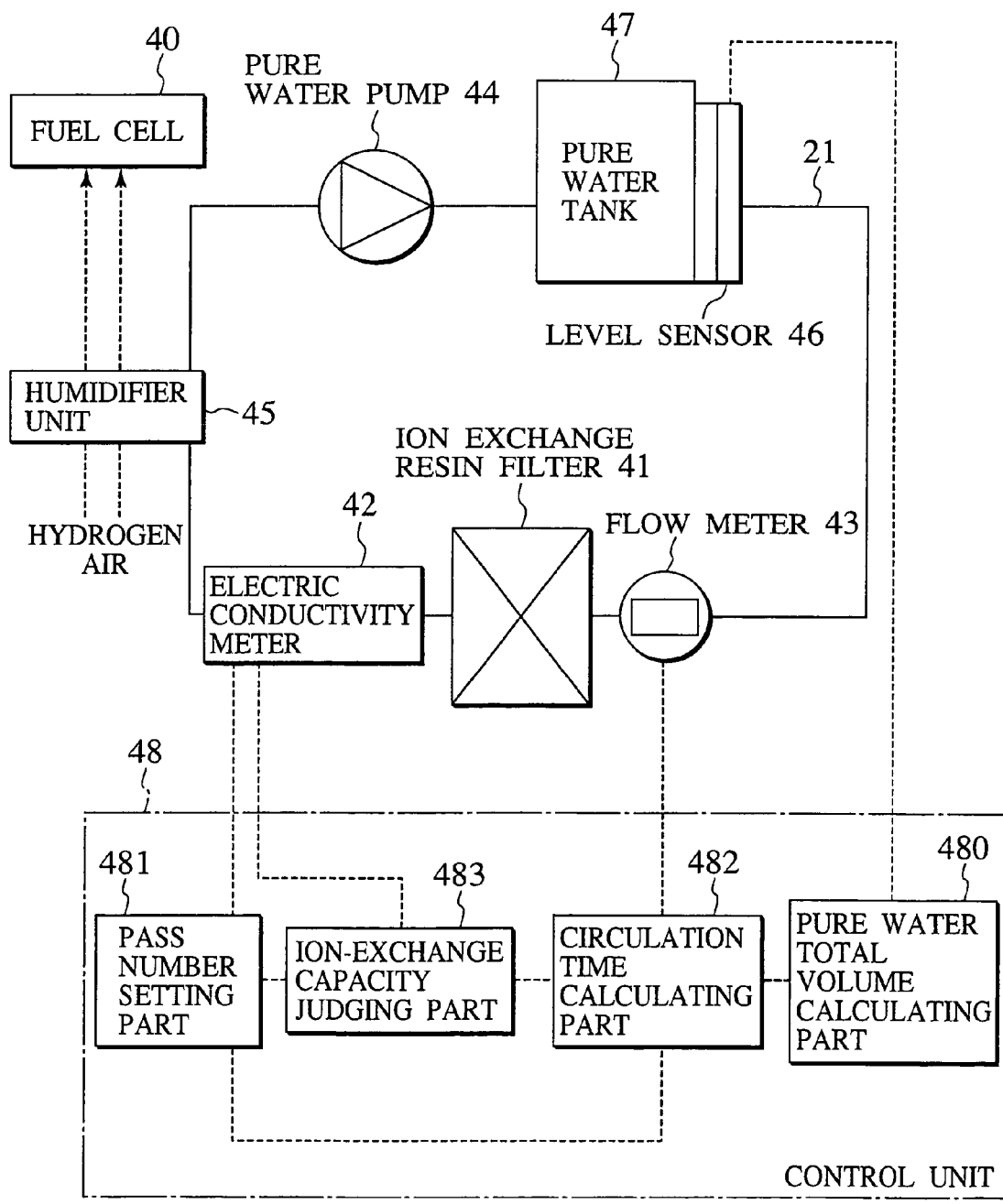
FIG. 4 is a view showing the configuration of a pure water humidifier system in a fuel cell system according to a second embodiment of the present invention.

FIG. 4 is a view showing the configuration of a pure water humidifier system in a fuel cell system according to a second embodiment of the present invention. The pure water humidifier system in accordance with the second embodiment as illustrated in FIG. 4 includes a fuel cell 40, an ion exchange resin filter 41 provided for collecting eluted ions and decreasing the electric conductivity, an electric conductivity meter 42 for measuring the electric conductivity of the pure water circulated in the system, a flow meter 43 for measuring the flow rate of the pure water, a pure water pump 44 for circulating the pure water, a humidifier part 45 for humidifying the fuel system and the air system, a pure water tank 47 provided with a level sensor 46 for measuring the water level of the pure water in a circulating flow path 21, and a control unit 48 for judging when the ion exchange resin filter needs replacement.

The control unit 48 is provided with a pure water total volume calculating part 480 for calculating the total volume of pure water with reference to the height of the pure water in the pure water tank 47 is detected by the level sensor 46, a pass number setting part 481 for setting a pass number before measuring the electric conductivity as a criterion for judging the ion-exchange capacity of the ion exchange resin filter 41, and a circulation time calculating part 482 for calculating a circulation time period to elapse before measurement of the electric conductivity on the basis of the total volume of the pure water in the system, the pass number as set by the pass number setting part 481 and the flow rate of the pure water as measured by the flow meter 43. Furthermore, the control unit 48 is provided with an ion-exchange capacity judging part 483 for judging whether or not the ion exchange resin filter 41 needs replacement on the basis of an anticipated electric conductivity value calculated as being measured after a predetermined pass number on the assumption that the ion-exchange efficiency of the ion exchange resin filter 41 is normal and the electric conductivity actually measured by the electric conductivity meter 42 after the predetermined pass number.

Figure 5:
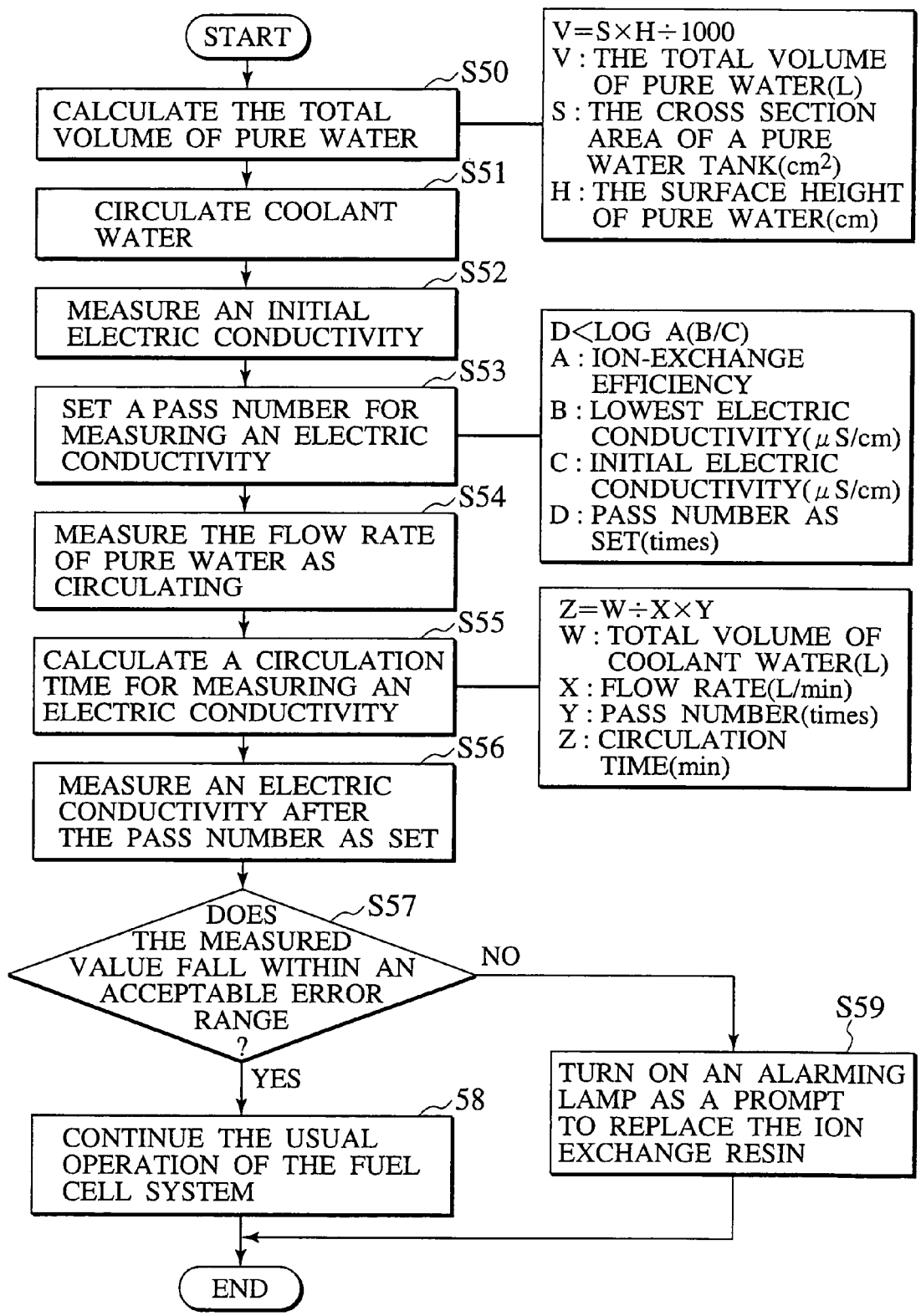
FIG. 5 is a flowchart showing the operation of the second embodiment of the present invention.

The operation of the present embodiment as described above will be explained with reference to the flowchart as shown in FIG. 5. When the operation of the fuel cell system starts, in the step S50, the water level of the pure water in the pure water tank 47 is measured by the level sensor 46 provided on the pure water tank 47 followed by calculating the total volume of the pure water in accordance with the following expression (3):

$$V = S \cdot H/1000 \quad (3),$$

where V is the total volume (in units of liters) of the pure water; S is the cross section area of the pure water tank (given information in units of cm$^2$); and H is the height (in units of cm) of the pure water as measured by the level sensor 46. Needless to say, this expression is only one example, and therefore it is generally possible to calculate the total volume for an arbitrary cross section area S(h) as a function of the height h in accordance with $V = \int^H S(h)dh/1000$. Incidentally, while it is assumed that the volume v of pure water located out of the pure water tank 47, i.e., located in the flow path 21 is sufficiently small as compared with the volume V of pure water located in the pure water tank 47 in the case of the present embodiment, the volume v of pure water may be taken account of the volume V as the total volume V+v.

Pure water starts circulating in the step S51 followed by measuring the initial electric conductivity of the pure water by the electric conductivity meter 42 in the step 52 just after circulating. The pass number setting part 481 then sets a pass number before measuring the electric conductivity as a criterion for judging the ion-exchange capacity of the ion exchange resin filter 41 on the basis of the electric conductivity as measured in the step S53. The ion-exchange capacity cannot be accurately estimated after the electric conductivity converges to a steady-state value, and therefore the pass number just before the convergence to the steady-state value is calculated in accordance with the expression (1).

In the step S54, the volume of pure water as circulating is measured by the flow meter 43. The circulation time calculating part 482 then serves to calculate the time to measure the electric conductivity as a criterion for judging the ion-exchange capacity in the step S55 on the basis of the total volume of pure water (given information), the flow rate of pure water as circulating as measured by the flow meter 43 and the pass number for measuring the electric conductivity as set by the pass number setting part 481 in accordance with the expression (2).

In the step S56, the electric conductivity is measured after the circulation time calculated in the step S55. Then, in the step S57, it is judged whether or not the electric conductivity actually measured falls within an acceptable range of error by comparing the electric conductivity actually measured with the electric conductivity value calculated as being measured after the predetermined pass number is counted on the assumption that the ion exchange resin filter 41 has a normal ion-exchange capacity.

If it is confirmed in the step S57 that the difference between the electric conductivity actually measured and the electric conductivity value expected with the normal ion-exchange capacity (i.e., with the operating life of the ion exchange resin filter 41 remaining to maintain the initial ion-exchange capacity) falls within an acceptable error range (for example within 5% or thereabout), then it is judged that the system is still able to continue operation of the fuel cell system in the step S58. On the other hand, if the difference between the electric conductivity actually measured and the electric conductivity value expected with the normal ion-exchange capacity falls outside the acceptable error range, then it is judged that the ion exchange resin filter 41 needs replacement, and an alarm lamp is turned on as a prompt to replace the ion exchange resin filter 41 in the step S59.

As explained above, in accordance with the present embodiment, the replacement time can be judged before the operating life of the ion exchange resin filter 41 expires, therefore avoiding problems such as a short circuit or isolation disruption caused in the fuel cell due to the elevation of the electric conductivity of humidifying pure water after the operating life of the ion exchange resin filter 41 expires.

Also, if the electric conductivity converges to a steady-state value after a pass number as the criterion for judging the ion-exchange capacity, i.e., after the electric conductivity converges to the steady-state value, the ion-exchange capacity of the ion exchange resin filter 41 cannot be accurately estimated. In order to avoid such a situation, the pass number for measuring the electric conductivity is set as a criterion for judging the ion-exchange capacity according to the initial electric conductivity in order to accurately evaluate an ion-exchange capacity in which the counting of the set pass number is always done before the electric conductivity converges to the steady-state value by use of the pass number.

Furthermore, by setting the reference electric conductivity to the electric conductivity to be measured if the ion exchange resin filter 41 has a normal ion-exchange capacity, the reference electric conductivity is adjusted in accordance with the variable judgment time and therefore the judgment is always accurate. The judgment of whether or not the ion exchange resin filter needs replacement is performed after a predetermined pass number so that it is possible to accurately judge even if the flow rate of water as circulating has changed.

This application claims benefit of priority under 35USC §119 to Japanese Patent Applications No. 2003-054275, filed on Feb. 28, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
a fuel cell;
a circulating pump;
an ion exchange resin filter;
an electric conductivity meter;
a circulating flow path including the fuel cell, the circulating pump, the ion exchange resin filter and the electric conductivity meter; and
a judgment part judging whether replacement of the ion exchange resin filter is needed based on a comparison between a predetermined reference electric conductivity and an electric conductivity of water circulating in the circulating flow path that is measured by the electric conductivity meter,
wherein the measurement of the electric conductivity of water circulating in the circulating flow path is scheduled at a predetermined time after a start of water circulation according to an initial electric conductivity of water circulating in the circulating flow path and an estimated time as the electric conductivity of water circulating in the circulating flow path asymptotically approaches a steady state value.

2. The fuel cell system according to claim 1 wherein the circulating flow path is a flow path through which coolant water is circulated to cool the fuel cell.

3. The fuel cell system according to claim 1 wherein the circulation in the flow path is a flow path through which pure water is circulated to humidify a fuel gas and an oxidizing agent which are supplied to the fuel cell.

4. The fuel cell system according to claim 1 wherein the predetermined time is set shorter than a period in which the electric conductivity of water circulating in the circulating flow path reaches a steady-state value.

5. The fuel cell system according to claim 1 wherein the predetermined time is set to be shorter, when the initial electric conductivity is smaller.

6. The fuel cell system according to claim 1 wherein the predetermined reference electric conductivity is an electric conductivity estimated as being measured in a case where ion-exchange efficiency has a normal ion-exchange capacity.

7. The fuel cell system according to claim 1 wherein the predetermined time is set to a period in which the water circulating in the circulating flow path circulates through the circulating flow path for a predetermined number of times.

8. The fuel cell system according to claim 1 further comprising a circulation time calculating part for determining the predetermined time after the start of the water circulation for measuring the electric conductivity of the water circulating in the circulating flow path.

9. A method of controlling a circulating flow path of a fuel cell system having a fuel cell, a circulating water pump, an ion exchange resin filter and an electric conductivity meter in the circulating flow path, comprising:
starting a water circulation;
determining a predetermined time for measuring the electric conductivity of water according to an initial electric conductivity of water circulating in the circulating flow path and an estimated time as the electric conductivity of water circulating in the circulating flow path asymptotically approaches a steady state value; and
judging whether the ion exchange resin filter needs replacement based on a comparison between a predetermined reference and an electric conductivity of water circulating in the circulating flow path as measured by the electric conductivity meter at the predetermined time after the start of water circulation.

10. A fuel cell system comprising:
a circulating means for circulating water in a fuel cell;
an ion-exchange means for exchanging ions in the circulating water;
a circulating flow path including an electric conductivity measuring means, the fuel cell, the circulating means, and the ion-exchange means; and
a judging means judging whether the ion exchange means needs replacement based on a comparison between a predetermined reference and an electric conductivity of water circulating in the circulating flow path as measured by the electric conductivity measuring means,
wherein the measurement of the electric conductivity of water circulating in the circulating flow path is scheduled at a predetermined time after a start of water circulation according to an initial electric conductivity of water circulating in the circulating flow path and an estimated time as the electric conductivity of water circulating in the circulating flow path asymptotically approaches a steady state value.

* * * * *

UNITED STATES PATENT AND TRADEMARK OFFICE
CERTIFICATE OF CORRECTION

PATENT NO. : 7,442,454 B2  Page 1 of 1
APPLICATION NO. : 10/780767
DATED : March 31, 2009
INVENTOR(S) : Keisuke Wakabayashi It is certified that error appears in the above-identified patent and that said Letters Patent is hereby corrected as shown below:

On the title page,

[*] Notice: Subject to any disclaimer, the term of this patent is extended or adjusted under 35 USC 154(b) by (458) days Delete the phrase "by 458 days" and insert -- by 709 days --

Signed and Sealed this

Twentieth Day of April, 2010

David J. Kappos
*Director of the United States Patent and Trademark Office*